US012783190B2

(12) United States Patent
Nampo

(10) Patent No.: US 12,783,190 B2
(45) Date of Patent: Nov. 3, 2026

(54) PRINTER, NON-TRANSITORY COMPUTER READABLE MEDIUM STORING PRINT DATA EDITING PROGRAM, AND PRINT DATA EDITING DEVICE

(71) Applicant: BROTHER KOGYO KABUSHIKI KAISHA, Nagoya (JP)

(72) Inventor: Hiromichi Nampo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 267 days.

(21) Appl. No.: 18/781,588

(22) Filed: Jul. 23, 2024

(65) Prior Publication Data

US 2025/0045002 A1 Feb. 6, 2025

(30) Foreign Application Priority Data

Jul. 31, 2023 (JP) ................................ 2023-124380

(51) Int. Cl.
*G06F 3/12* (2006.01)

(52) U.S. Cl.
CPC .......... *G06F 3/1251* (2013.01); *G06F 3/1208* (2013.01); *G06F 3/121* (2013.01); *G06F 3/1234* (2013.01); *G06F 3/1253* (2013.01)

(58) Field of Classification Search
CPC ...... G06F 3/1251; G06F 3/1208; G06F 3/121; G06F 3/1234; G06F 3/1253
See application file for complete search history.

(56) References Cited

U.S. PATENT DOCUMENTS

| | | | |
|---|---|---|---|
| 5,562,353 A | 10/1996 | Handa et al. | |
| 2009/0103123 A1 | 4/2009 | Ikedo et al. | |
| 2013/0342856 A1* | 12/2013 | Boot | B41J 3/46 358/1.6 |
| 2014/0226169 A1* | 8/2014 | Jacobs | G06K 15/024 358/1.2 |
| 2019/0087137 A1* | 3/2019 | Yasui | G06F 3/1243 |
| 2019/0212951 A1* | 7/2019 | Yasui | G06F 3/1205 |

FOREIGN PATENT DOCUMENTS

| | | |
|---|---|---|
| JP | H07-156499 A | 6/1995 |
| JP | H10-157210 A | 6/1998 |
| JP | 2000-225746 A | 8/2000 |
| JP | 2004-130683 A | 4/2004 |
| JP | 2007-36327 A | 2/2007 |
| JP | 2009-93247 A | 4/2009 |
| JP | 2015-527944 A | 9/2015 |

* cited by examiner

*Primary Examiner* — Huo Long Chen
(74) *Attorney, Agent, or Firm* — Kenealy Vaidya LLP

(57) ABSTRACT

A processor of a printer determines whether a configuration of a print data for printing on a first medium in a first cassette and a configuration of a print data for printing on a second medium in a second cassette are at least partially compatible or incompatible in a case where the second cassette is detected to be attached to the printer while a first edit process editing the print data for the first medium. In a case where they are compatible, the first edit process is changed to a second edit process editing the print data for the second medium. In a case where they are incompatible, the print data in the first edit process is deleted, and a new print data is edited in the second edit process, or the print data in the first edit process is not deleted and edited in the first edit process.

8 Claims, 11 Drawing Sheets

FIG. 10

| CURRENT EDIT MODE | TYPE OF LABEL | TYPE OF TAPE INSTALLED | HANDLING WHEN CHANGING EDIT MODES |
|---|---|---|---|
| STANDARD TAPE EDIT MODE | GENERAL-PURPOSE LABEL<br>FACEPLATE LABEL<br>PUNCHDOWN LABEL (TEXT)<br>PATCH PANEL LABEL<br>CABLE WRAP LABEL<br>CABLE FLAG LABEL | STANDARD TAPE | NO CHANGE |
| | | HS TAPE | TRANSFER TEXT |
| | | SL TAPE | |
| | PUNCHDOWN LABEL (HORIZONTAL ARRANGEMENT)<br>PUNCHDOWN LABEL (BACKBONE) | STANDARD TAPE | NO CHANGE |
| | | HS TAPE | CONFIRM TEXT DELETE |
| | | SL TAPE | |
| HS TAPE EDIT MODE | HEAT-SHRINKABLE TUBE LABEL | STANDARD TAPE | TRANSFER TEXT |
| | | HS TAPE | NO CHANGE |
| | | SL TAPE | TRANSFER TEXT |
| SL TAPE EDIT MODE | SELF-LAMINATING LABEL | STANDARD TAPE | |
| | | HS TAPE | |
| | | SL TAPE | NO CHANGE |

PRINTER, NON-TRANSITORY COMPUTER READABLE MEDIUM STORING PRINT DATA EDITING PROGRAM, AND PRINT DATA EDITING DEVICE

REFERENCE TO RELATED APPLICATIONS

This application claims priority from Japanese Patent Application No. 2023-124380 filed on Jul. 31, 2023. The entire content of the priority application is incorporated herein by reference.

BACKGROUND ART

The present disclosure relates to a printer, a non-transitory computer readable medium storing a print data editing program, and a print data editing device.

A label data-creating device according to related art obtains information about a roll sheet set in a tape printer when layout editing software is launched. The label data-creating device is able to set, based on the obtained information, a layout editing screen for editing label data to be printed on the roll sheet to a screen that matches the type of roll sheet.

SUMMARY

In the label data-creating device described above, in a case where a user replaces the roll sheet set in the tape printer with another type of roll sheet while editing the label data, it is possible that the layout of the label data being edited may no longer match the type of replaced roll sheet.

An object of the present disclosure is to provide a printer that enables print data to be edited to an appropriate configuration matching the medium to be printed, a non-transitory computer readable medium storing a print data editing program, and a print data editing device.

A first aspect of the present disclosure provides a printer that includes a cassette compartment to which a cassette housing a medium being detachably attachable, a detector for detecting a type of the cassette attached to the cassette compartment, and a printing portion for printing an image based on print data on the medium drawn out from the cassette. The printer further includes a display for displaying information, an input portion for receiving input of an operation, a processor, and a memory. The memory is configured to store computer-readable instructions that instruct the processor to perform a first edit process, a second edit process, a change process, and a selection process. The first edit process displays a first edit screen on the display and edits the print data. The first edit screen is an edit screen matching a first medium housed in a first cassette. The first cassette is one type of the cassette. The second edit process displays a second edit screen on the display and edits the print data. The second edit screen is an edit screen matching a second medium housed in a second cassette. The second cassette is a different type than the first cassette. The change process changes a process to edit the print data from the first edit process to the second edit process. The selection process displays a selection screen presenting options on the display and receives a selection of the option via the input portion. The computer-readable instructions further instruct the processor to perform following processes, in a case where the detector detects the second cassette is attached to the cassette compartment while the first edit process is being executed. The processor determines whether a configuration of the print data for printing on the first medium and a configuration of the print data for printing on the second medium are at least partially compatible. The processor executes the change process with a compatible portion of the configuration of the print data between the configuration of the print data for printing on the first medium and the configuration of the print data for printing on the second medium maintained in a case where the processor determines that the configuration of the print data for printing on the first medium and the configuration of the print data for printing on the second medium are at least partially compatible. The processor executes the selection process and receiving the selection of a first option or a second option through the input portion in a case where the processor determines that the configuration of the print data for printing on the first medium and the configuration of the print data for printing on the second medium are incompatible. The first option deletes the print data edited in the first edit process and edits a new print data in the second edit process. The second option does not delete the print data edited in the first edit process and edits the print data in the first edit process.

In a case where the print data to be printed on the first medium is compatible with the print data to be printed on the second medium, the processor can move on to the second edit process while maintaining the print data edited in the first edit process without asking the user whether the print data is deleted. Therefore, the processor can smoothly change from the first edit process to the second edit process without bothering the user with inquiries. On the other hand, in a case where the print data to be printed on the first medium is incompatible with the print data to be printed on the second medium, the processor can ask the user whether to move on to erase the print data and move on to the second edit process, or keep the print data and continue executing the first edit process. Therefore, even if the user accidentally replaces the cassette with an incorrect cassette, the processor can continue to edit the original print data by the first edit process if the original cassette is returned.

A second aspect of the present disclosure provides a non-transitory computer-readable medium storing computer-readable instructions for editing print data that are executed by a processor provided in a printer. The printer includes a cassette compartment to which a cassette housing a medium to be printed being detachably attachable, a detector for detecting a type of the cassette installed in the cassette compartment, a printing portion for printing on the medium drawn out from the cassette, a display for displaying information, and an input portion for receiving input of an operation, for printing, on a medium, an image based on the print data used to print on the medium. The computer-readable instructions instructing the processor to perform a first edit process, a second edit process, a change process, and a selection process. The first edit process displays a first edit screen on the display and edits the print data. The first edit screen is an edit screen matching a first medium housed in a first cassette. The first cassette is one type of the cassette. The second edit process displays a second edit screen on the display and edits the print data. The second edit screen is an edit screen matching a second medium housed in a second cassette. The second cassette is a different type than the first cassette. The change process changes a process to edit the print data from the first edit process to the second edit process. The selection process displays a selection screen presenting options on the display and receives a selection of the option via the input portion. The computer-readable instructions further instruct the processor to perform following processes, in a case where the detector detects the second cassette is attached to the cassette compartment while the first edit process is being executed. The processor determines whether a configuration of the print data for printing on the first medium and a configuration of the print data for printing on the second medium are at least partially compatible. The processor executes the change process with a compatible portion of the configuration of the print data between the configuration of the print data for printing on the first medium and the configuration of the print data for printing on the second medium maintained in a case where the processor determines that the configuration of the print data for printing on the first medium and the configuration of the print data for printing on the second medium are at least partially compatible. The processor executes the selection process and receiving the selection of a first option or a second option through the input portion in a case where the processor determines that the configuration of the print data for printing on the first medium and the configuration of the print data for printing on the second medium are incompatible. The first option deletes the print data edited in the first edit process and edits a new print data in the second edit process. The second option does not delete the print data edited in the first edit process and edits the print data in the first edit process. Therefore, the non-transitory computer readable medium storing the print data editing program according to the second aspect displays the same effect as the printer according to the first aspect.

A third aspect of the present disclosure provides a print data editing device for editing print data used by a printer to print on a medium. The printer includes a cassette compartment to which a cassette housing the medium to be printed being detachably attachable, a detector for detecting a type of the cassette installed in the cassette compartment, and a printing portion for printing on the medium drawn out from the cassette. The print data editing device further includes a display for displaying information, an input portion for receiving input of an operation, a processor, and a memory. The memory is configured to store computer-readable instructions that instruct the processor to perform a first edit process, a second edit process, a change process, and a selection process. The first edit process displays a first edit screen on the display and edits the print data. The first edit screen is an edit screen matching a first medium housed in a first cassette. The first cassette is one type of the cassette. The second edit process displays a second edit screen on the display and edits the print data. The second edit screen is an edit screen matching a second medium housed in a second cassette. The second cassette is a different type than the first cassette. The change process changes a process to edit the print data from the first edit process to the second edit process. The selection process displays a selection screen presenting options on the display and receives a selection of the option via the input portion. The computer-readable instructions further instruct the processor to perform processes, in a case where the detector detects the second cassette is attached to the cassette compartment while the first edit process is being executed. The processor determines whether a configuration of the print data for printing on the first medium and a configuration of the print data for printing on the second medium are at least partially compatible. The processor executes the change process with a compatible portion of the configuration of the print data between the configuration of the print data for printing on the first medium and the configuration of the print data for printing on the second medium maintained in a case where the processor determines that the configuration of the print data for printing on the first medium and the configuration of the print data for printing on the second medium are at least partially compatible. The processor executes the selection process and receiving the selection of a first option or a second option through the input portion in a case where the processor determines that the configuration of the print data for printing on the first medium and the configuration of the print data for printing on the second medium are incompatible. The first option deletes the print data edited in the first edit process and edits a new print data in the second edit process. The second option does not delete the print data edited in the first edit process and edits the print data in the first edit process. Therefore, the print data editing device according to the third aspect displays the same effect as the printer according to the first aspect.

BRIEF DESCRIPTION OF DRAWINGS

FIG. 10 is a mode change handling table showing the handling when changing edit modes.

DESCRIPTION

Figure 1:
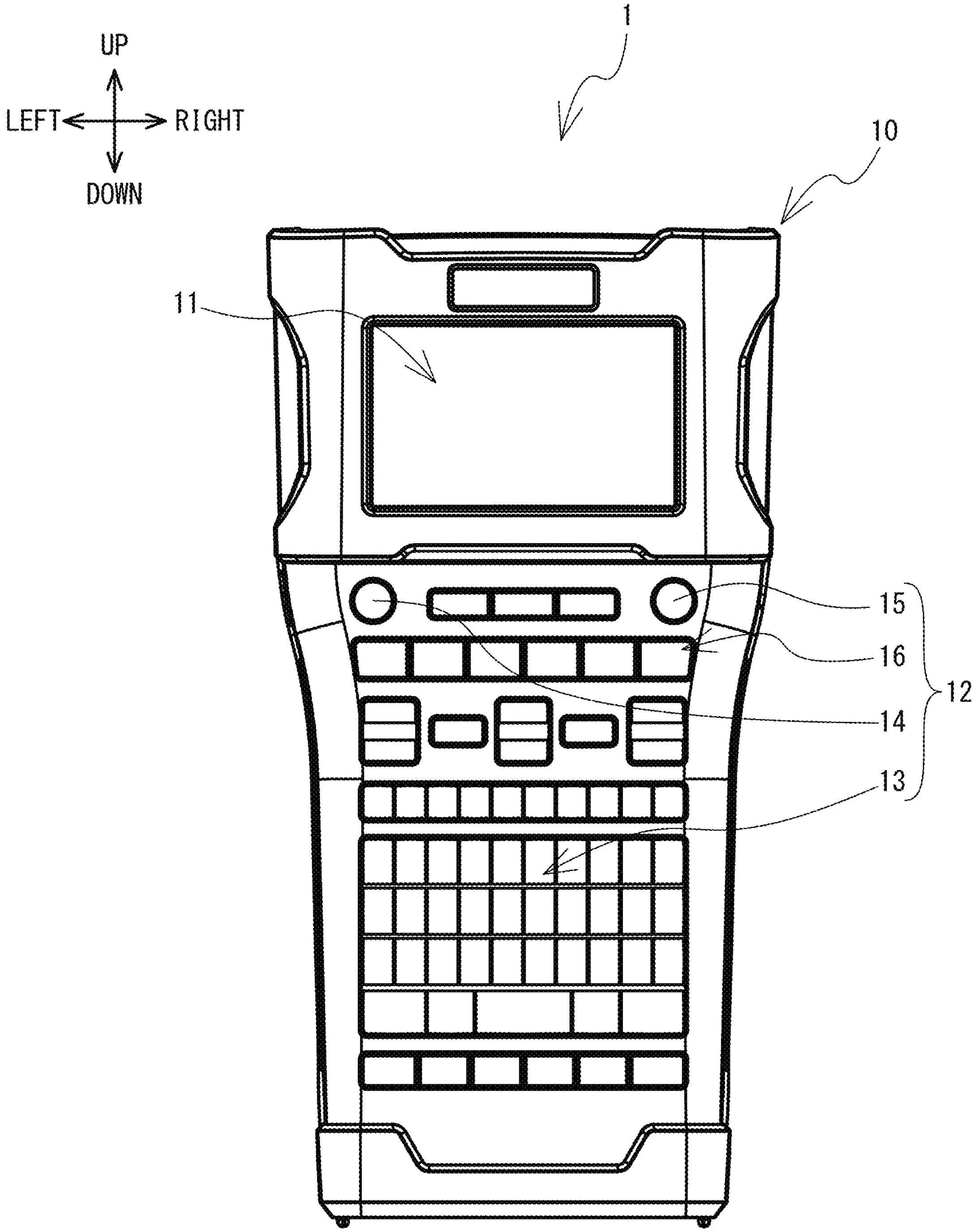
FIG. 1 is a plan view of a printer.

A printer 1, which is a first embodiment of the present disclosure, will be described with reference to the drawings. In descriptions related to the following directions, up-down, left-right, and front-rear indicated by arrows in the drawings will be used based on the direction in which the user operates the input portion 12.

Figure 2:
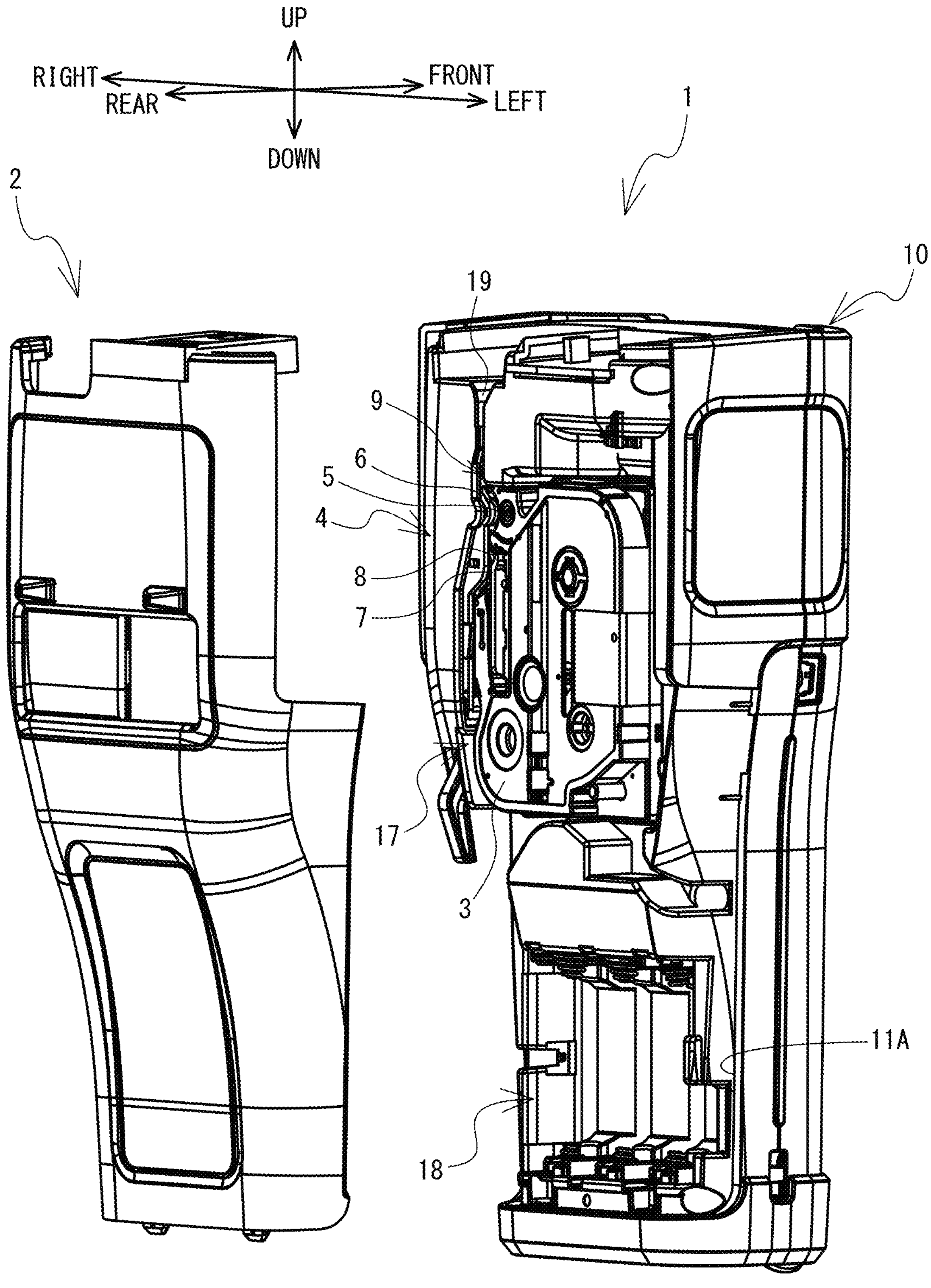
FIG. 2 is a rear perspective view of the printer with an access cover removed.

The printer 1 shown in FIG. 1 and FIG. 2 is a hand-held electronic device that can be used held (hand-held) by a user. The printer 1 can use various types of tape cassettes 3, for example, a laminated type, a receptor type, a heat-shrinkable tube type, a self-laminating type, or the like. The tape cassette 3 stores a long medium inside. The medium is, for example, a laminated tape, a receptor tape, a heat-shrinkable tube tape, or a self-laminating tape, which will collectively be referred to as "tape". "Laminated tape" is a tape in which printing is performed on a transparent resin film tape and then a double-sided adhesive tape is adhered to the printed surface. "Receptor tape" is a single-sided adhesive tape made of resin. "Heat-shrinkable tube tape" is a tubular tape made of material that shrinks when heated. "Self-laminating tape" is a tape in which printing is performed on one-sided adhesive tape made of resin, and then this tape is adhered to a surface to which it is to be adhered while the printed surface is covered by some transparent film tape made of resin. The printer 1 can execute a printing operation that prints, on a tape to create a label, an image of a character, number, symbol, figure, and the like (hereinafter, referred to as "text" for convenience) made up of a plurality of dots.

The printer 1 is provided with a housing 10, a display 11, the input portion 12, and an access cover 2. The housing 10 has a long box shape in the up-down direction, and the display 11 and the input portion 12 are provided on a front surface thereof. The front surface is a surface on the side that the user looks toward when operating the printer 1. The display 11 is a liquid crystal display, for example, and can display various information. The display 11 is located on the front surface of the housing 10, above the substantial center of the housing 10 in the up-down direction.

The input portion 12 receives input of various information in response to a user operation. The input portion 12 is located on the front surface of the housing 10, below the display 11. The input portion 12 of the present embodiment is a keyboard that includes character keys 13, a power key 14, a print key 15, and label editing keys 16. The character keys 13 are a group of keys the user presses when inputting text. The power key 14 is a key the user presses when turning the power supply of the printer 1 on and off. The print key 15 is a key the user presses when instructing to print on the tape. The label editing keys 16 are a group of keys the user presses when specifying a label to be created.

The housing 10 has an opening 11A on a back surface thereof. The opening 11A is communicated with a cassette compartment 17 in which the tape cassette 3 is installed, and a battery compartment 18 in which batteries (not shown in the drawings) are installed. The cassette compartment 17 is provided above the substantial center in the up-down direction inside the housing 10. The battery compartment 18 is provided below the cassette compartment 17 inside the housing 10. The cassette compartment 17 and the battery compartment 18 are both recessed toward the front within the housing 10, and are exposed to the outside of the housing 10 through the opening 11A. The user installs/removes the tape cassette 3 and the batteries to/from cassette compartment 17 and the battery compartment 18, respectively, from the rear of the housing 10 in the front-rear direction.

The cassette compartment 17 can accept various tape cassettes 3. The tape cassette 3 is provided with an indicator (not shown in the drawings) to indicate the type of tape cassette 3. The indicator includes at least one hole portion (not shown in the drawings) provided in a defined pattern according to the type of type. The printer 1 is provided with a detector 33 (refer to FIG. 3) that has a plurality of detection switches (not shown in the drawings). Each of the hole portions is provided at a position corresponding to one of the plurality of detection switches. Therefore, in a case where the tape cassette 3 is installed in the printer 1, the detection switches are selectively pressed by the indicator. The printer 1 detects the type of the tape cassette 3 based on the on/off combination of the detection switches at that time.

Figure 3:
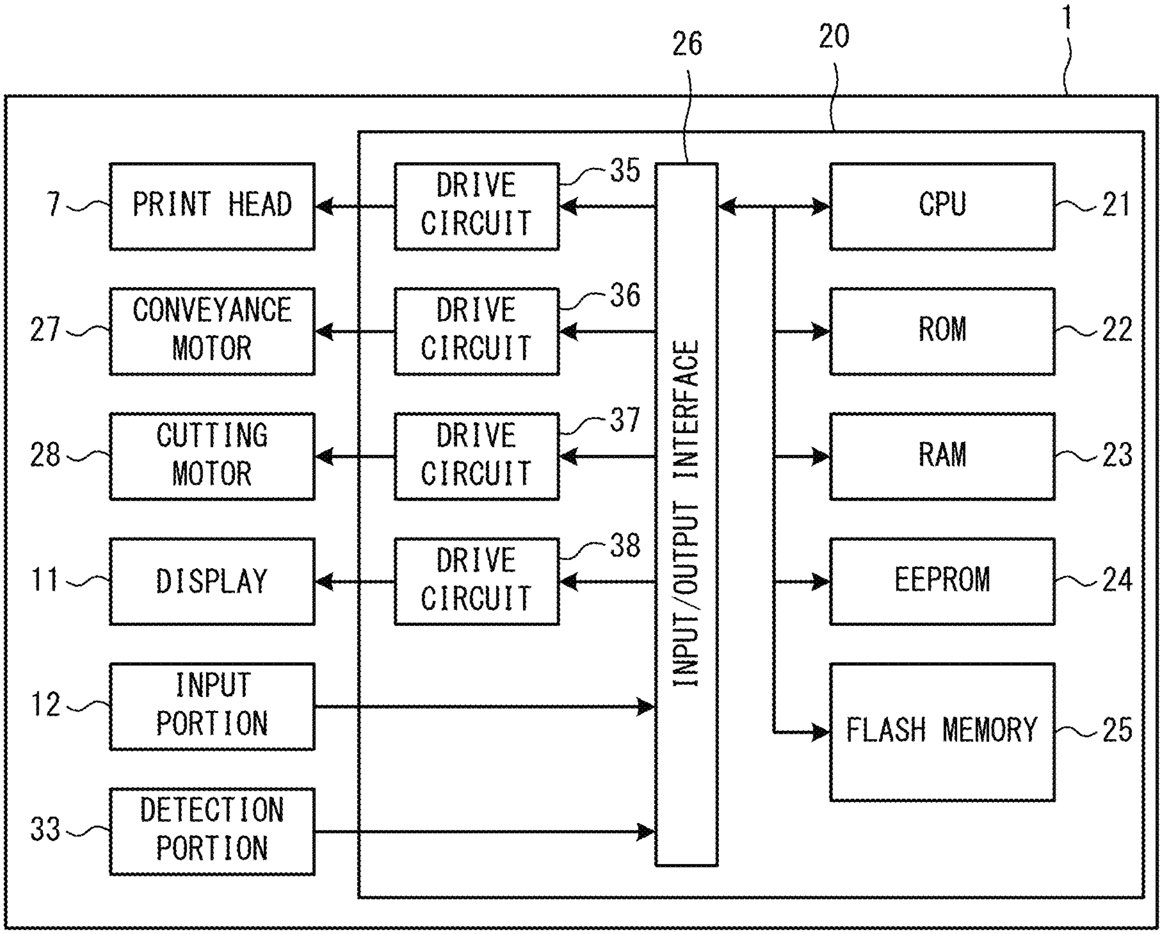
FIG. 3 is a block diagram showing an electrical configuration of the printer.

The housing 10 houses therein a printing portion 4, a cutting portion 9, and a control circuit 20 (refer to FIG. 3). The printing portion 4 is arranged around the cassette compartment 17. The printing portion 4 includes a tape drive shaft 5, a conveyance roller 6, a print head 7, a platen roller 8, and a conveyance motor 27 (refer to FIG. 3), and the like. The tape drive shaft 5 is rotated by the driving of the conveyance motor 27, to convey a tape drawn out from the tape cassette 3 in cooperation with the conveyance roller 6. The platen roller 8 rotates while pressing the tape and an ink ribbon (not shown in the drawings) against the print head 7. The print head 7 is a thermal head provided with a plurality of heating elements (not shown in the drawings). The print head 7 prints an image by transferring ink from the ink ribbon to the tape being conveyed by the platen roller 8. The tape onto which the image has been printed is then ejected out of the printer 1 from an ejection port 19 formed in the top of the housing 10.

The cutting portion 9 is provided midway in a path along which the tape is conveyed from the cassette compartment 17 to the ejection port 19. The cutting portion 9 is provided with a movable blade (not shown in the drawings), a fixed blade (not shown in the drawings), and a cutting motor 28 (refer to FIG. 3). The movable blade is moved by the driving of the cutting motor 28 and cuts the printed tape sandwiched between the movable blade and the fixed blade. The control circuit 20 is formed on a control board (not shown in the drawings) located in the housing 10 in front of the battery compartment 18. The control circuit 20 controls the driving of the printer 1. The access cover 2 engages with the opening 11A of the housing 10 to open and close the cassette compartment 17 and the battery compartment 18. The access cover 2 is long in the up-down direction and forms a back surface of the housing 10.

The electrical configuration of the printer 1 will now be described with reference to FIG. 3. The control circuit 20 of the printer 1 includes a CPU 21, ROM 22, RAM 23, EEPROM 24, flash memory 25, an input/output interface 26, and drive circuits 35 to 38. The CPU 21, the ROM 22, the RAM 23, the EEPROM 24, the flash memory 25, and the input/output interface 26 are electrically connected via a bus.

The CPU 21 controls the entire printer 1. The ROM 22 stores various programs necessary for controlling the printer 1. The CPU 21 performs various arithmetic calculations based on the programs stored in the ROM 22. The RAM 23 temporarily stores data. The EEPROM 24 stores printing dot pattern data for printing characters, classified by format and size. The flash memory 25 stores a program for edit processing (refer to FIG. 4) to be described later, medium information, and initial values, and the like. Also, the flash memory 25 stores setting values (current values) for which the user has changed the initial values when editing the image to be printed on the tape in the edit processing.

The medium information is information indicating the type of tape. The types of tape used by the printer 1 of the present embodiment are laminated tape, receptor tape, heat-shrinkable tube tape, and self-laminating tape. The initial values are various default setting values that are set when forming an image on the tape. The setting values include, for example, label length (length of tape to be cut), text placement in the print area (vertical writing, horizontal writing, rotation angle, left alignment, center alignment, right alignment, etc.), font size, typeface, number of lines of text, number and size of blocks (number of blocks into which the print area is to be divided), text repetition settings, and cable diameter.

The input/output interface 26 is connected to the drive circuits 35 to 38, the input portion 12, and the detector 33. The drive circuit 35 selectively heats a plurality of the heating elements of the print head 7. The drive circuits 36 and 37 drive the conveyance motor 27 and cutting motor 28, respectively. The conveyance motor 27 is connected to the tape drive shaft 5 and a ribbon take-up shaft (not shown in the drawings). The cutting motor 28 is connected to the movable blade. The drive circuit 38 has VRAM (not shown in the drawings) for displaying an image on the display 11, and performs display control of the display 11. The input portion 12 outputs information indicating the type of selected key to the CPU 21 via the input/output interface 26. The detector 33 outputs on/off information of the detection switches to the CPU 21 via the input/output interface 26.

Next, the type of labels that can be created with the printer 1, their applications, and their corresponding tapes, will be described. As shown in FIG. 4 and FIG. 5, the labels that can be created with a standard tape include a general-purpose label 51A, a faceplate label 52A, punchdown labels 53A, 54A, 55A, a patch panel label 56A, a cable wrap label 57A, a cable flag label 58A, a heat-shrinkable tube label 59A, and a self-laminating label 60A. The general-purpose label 51A, the faceplate label 52A, the punchdown labels 53A, 54A, 55A, the patch panel label 56A, the cable wrap label 57A, and the cable flag label 58A can be created by printing images on laminated tape and receptor tape. For convenience in the description below, laminated tape and receptor tape will be referred to as "standard tape". The heat shrinkable tube label 59A and the self-laminating label 60A can be created by printing images on heat-shrinkable tube tape and self-laminating tape, respectively. For convenience in the description below, heat-shrinkable tube tape and self-laminating tape will be referred to as "HS tape" and "SL tape", respectively.

Figure 4A:
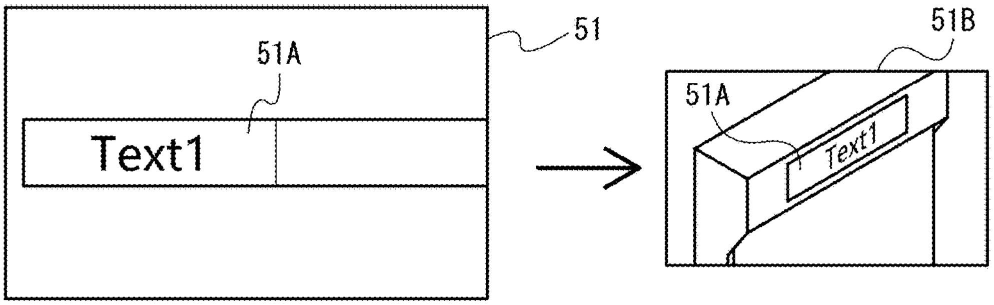
FIGS. 4A-4E are views showing edit screens of a label.

An edit screen 51 shown in FIG. 4A is a screen for editing an image to be printed on the standard tape when creating the general-purpose label 51A in edit processing. As shown in affixing example 51B, the general-purpose label 51A is a label used for general purposes. The user can set the label length, the text placement, the font size, the typeface, and number of lines of text and the like on the edit screen 51. Also, the user can input text while checking, on the edit screen 51, a completed example of the general-purpose label 51A, which places the text on the standard tape and indicates the tape cutting position.

Figure 4B:
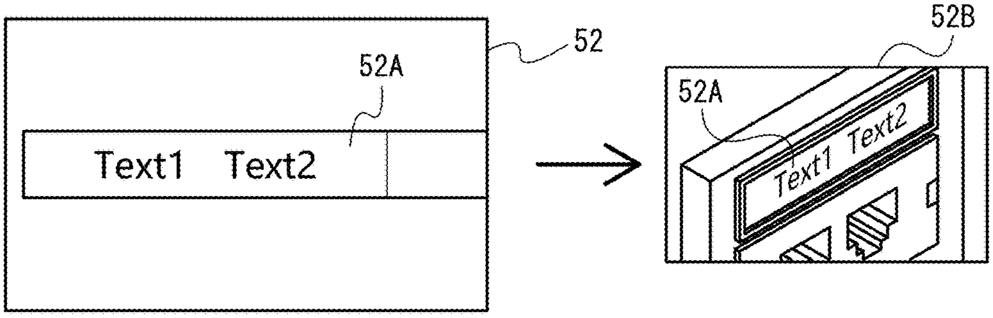

An edit screen 52 shown in FIG. 4B is a screen for editing an image to be printed on the standard tape when creating the faceplate label 52A in the edit processing. As shown in affixing example 52B, the faceplate label 52A is a label suited for a name portion of a faceplate of, for example, a jack provided on a wall for connecting a plug of a LAN cable or the like. The user can set the length of the label, the text placement, the font size, the typeface, the number of lines of text, and the number and size of blocks and the like on the edit screen 52. Also, the user can input text while checking, on the edit screen 52, a completed example of the faceplate label 52A, which places the text on the standard tape and indicates the tape cutting position.

Figure 4C:
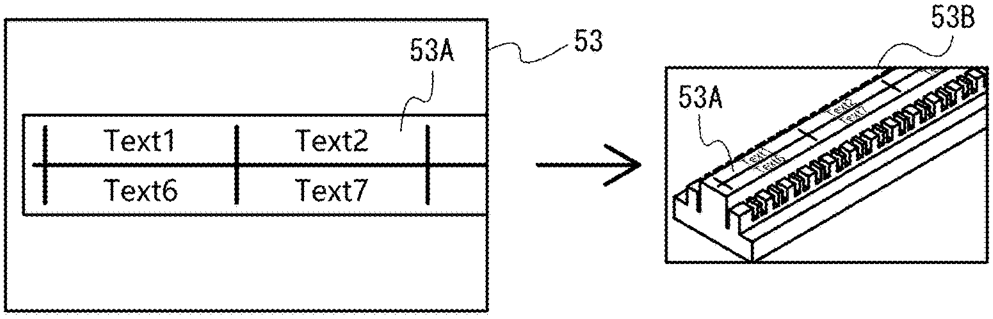

An edit screen 53 shown in FIG. 4C is a screen for editing an image to be printed on the standard tape when creating the punchdown label 53A in the edit processing. As shown in affixing example 53B, the punchdown label 53A is a label suited for the name portion of a punchdown block provided with a connector that connects the core wires of a LAN cable or the like. The punchdown label 53A is a label suited for displaying text in each block of a punchdown block. The punchdown label 53A can, for connector groups divided into blocks by cable unit in the punchdown block, display, divided into blocks, text identifying each connector group, on the label. A separation line can be displayed between blocks. The user can set the length of the label, the number and size of the blocks, the text placement, the font size, and the typeface and the like on the edit screen 53. Also, the user can input text while checking, on the edit screen 53, a completed example of the punchdown label 53A, which places the text for each block on the standard tape and indicates the separation lines and the tape cutting position.

Figure 4D:
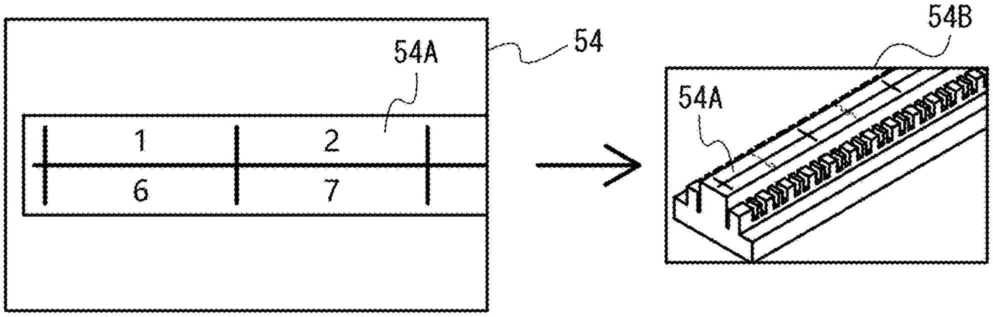
Figure 4E:
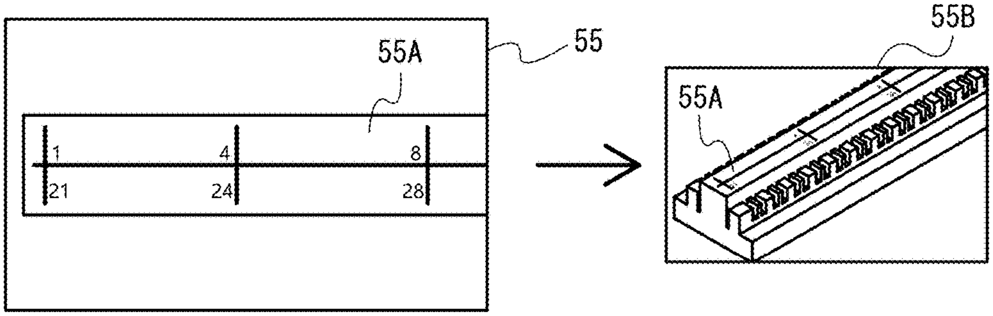

Edit screens 54 and 55 shown in FIG. 4D and FIG. 4E are screens for editing an image to be printed on the standard tape when creating the punchdown labels 54A and 55A in the edit processing, respectively. As shown in each of affixing examples 54B and 55B, the punchdown labels 54A and 55A are labels suited for the name portions of the punchdown block. The punchdown label 54A is a label suited for displaying a block number in a punchdown block. The punchdown label 54A can display, as text lined up in a horizontal arrangement in numerical order for each blocked portion of the label, a number for identifying each group of connectors in a punchdown block. The punchdown label 55A is a label suited for a punchdown block used in a backbone (trunk line) of a network. The punchdown label 55A can display, as text, a plurality of skipped numbers for each portion where connector numbers for identifying the connectors of each punchdown block are divided into blocks on the label. A separation line can be displayed between blocks. The user can set the length of the label, the number and size of the blocks, and the starting number of the block number or the connector number and the like on the edit screens 54 and 55. The user can check, on the edit screens 54 and 55, a completed example of the punchdown labels 54A and 55A, which places the text showing the block number or connecting number on the standard tape for each block and indicates the separation lines and the tape cutting position.

Figure 5A:
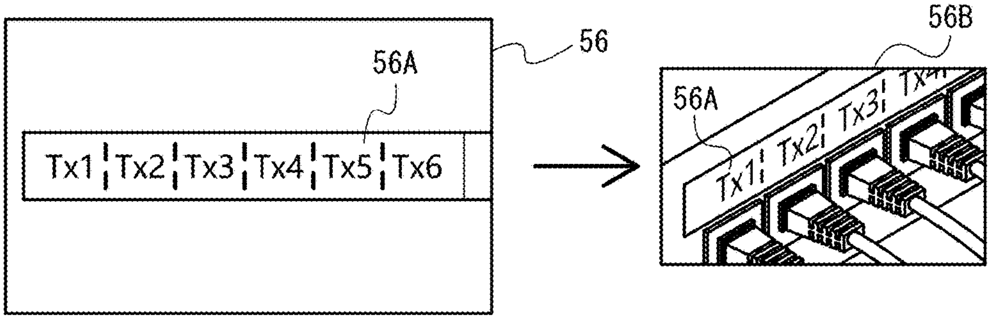
FIGS. 5A-5E are views showing edit screens of the label.

An edit screen 56 shown in FIG. 5A is a screen for editing an image to be printed on the standard tape when creating the patch panel label 56A in the edit processing. As shown in affixing example 56B, the patch panel label 56A is a label suited for a name portion of a patch panel provided with a jack for connecting a plug of a LAN cable or the like. The patch panel label 56A is divided into blocks corresponding to each of the jacks provided in the patch panel, and can display text in each block. A separation line can be displayed between blocks. The user can set the length of the label, the number and size of the blocks, the text placement, the font size, and the typeface and the like on the edit screen 56. Also, the user can input text while checking, on the edit screen 56, a completed example of the patch panel label 56A, which places the text for each block on the standard tape and indicates the separation lines and the tape cutting position.

Figure 5B:
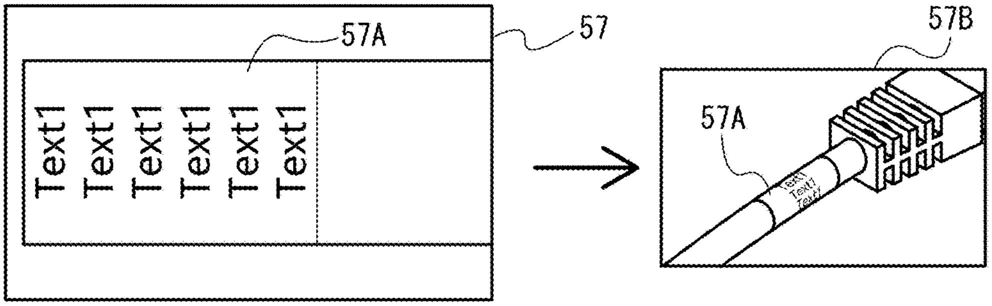

An edit screen 57 shown in FIG. 5B is a screen for editing an image to be printed on the standard tape when creating the cable wrap label 57A in the edit processing. As shown in affixing example 57B, the cable wrap label 57A is a label suited for being affixed wrapped around an outer peripheral surface of a LAN cable or the like. The cable wrap label 57A can show one or a plurality of lines of text written in the axial direction of the cable and repeated in the circumferential direction. The user can set the text placement, the font size, the typeface, the repeat text setting, and the cable diameter and the like on the edit screen 57. Also, the user can input text while checking, on the edit screen 57, a completed example of the cable wrap label 57A, which places the text in one line, or repeatedly on a plurality of lines, on the standard tape and indicates the tape cutting position.

Figure 5C:
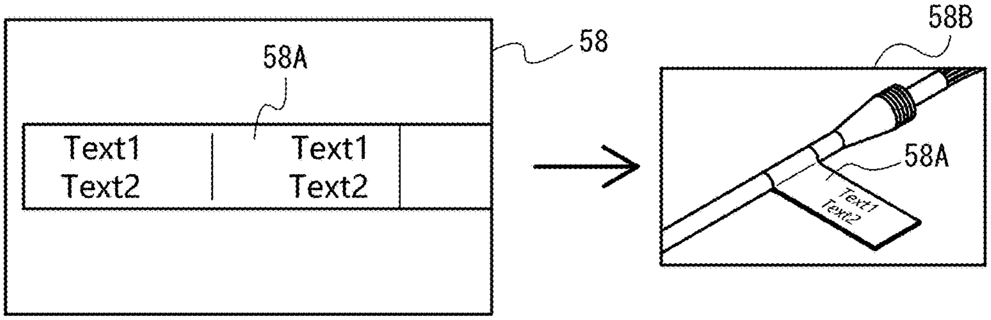

An edit screen 58 shown in FIG. 5C is a screen for editing an image to be printed on the standard tape when creating the cable flag label 58A in the edit processing. As shown in affixing example 58B, the cable flag label 58A is a label that can be affixed in a flag shape to a cable by wrapping a center portion around the outer peripheral surface of a LAN cable or the like and affixing both ends together. The cable flag label 58A provides a block displaying the same text on both sides of the label and thus makes it possible to check the text on both sides of the portions that are affixed together in the flag shape. It is possible to display a center line in the center of the label to align it with the axis of the cable when affixing the label. The user can set the text placement, the font size, the typeface, the number of lines of text, and the cable diameter and the like on the edit screen 58. The position of the block can be set, as appropriate, according to the cable diameter. Also, the user can input text while checking, on the edit screen 58, a completed example of the cable flag label 58A, which places the text on the standard tape and indicates the center line and the tape cutting position.

Figure 5D:
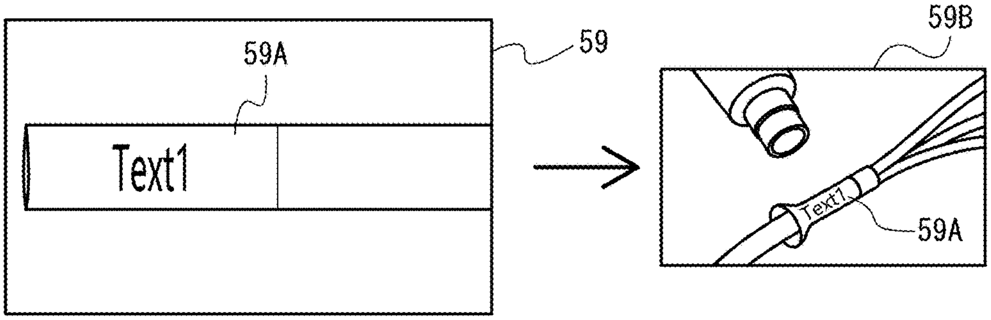

An edit screen 59 shown in FIG. 5D is a screen for editing an image to be printed on the HS tape when creating the heat-shrinkable tube label 59A in the edit processing. As shown in affixing example 59B, the heat-shrinkable tube label 59A is a label that can be wrapped around the outer peripheral surface of a cable by placing the heat-shrinkable tube label 59A over the outer peripheral surface of a LAN cable or the like, and then heating it with a heat gun or the like to shrink it. The heat-shrinkable tube label 59A can display text on the label created from HS tape, which is made from heat-shrinkable tube folded into a tape shape. The user can set the text placement, the font size, and the typeface and the like on the edit screen 59. Note that the print area of the HS tape is configured to shrink with the heat-shrinkable tube, so a predetermined area is set beforehand. Also, the user can input text while checking, on the edit screen 59, a completed example of the heat-shrinkable tube label 59A prior to shrinking, which places the text on the HS tape and indicates the tape cutting position.

Figure 5E:
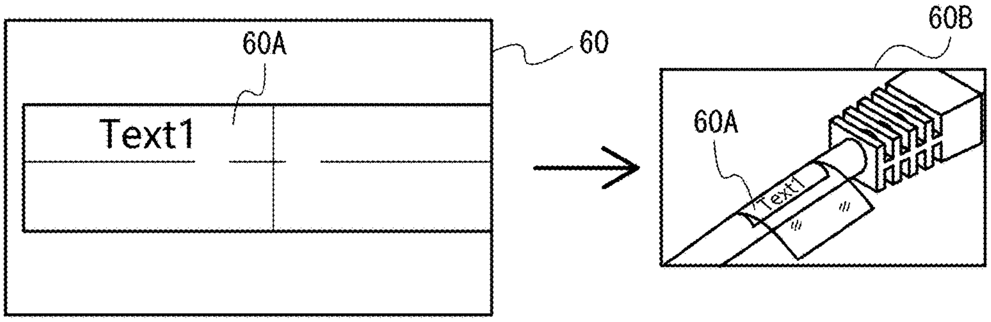

An edit screen 60 shown in FIG. 5E is a screen for editing an image to be printed on the SL tape when creating the self-laminating label 60A in the edit processing. As shown in affixing example 60B, the self-laminating label 60A is a label suited for affixing a label to the outer peripheral surface of a LAN cable or the like, and then wrapping and affixing a transparent film tape around the outer periphery of the cable with each label. The self-laminating label 60A has resin tape at a portion near one end of the tape in the width direction (the portion above the single-dotted line in the drawing). The text can be displayed on the resin tape. The portion at the other end is only transparent film tape. The user can set the text placement, the font size, and the typeface and the like on the edit screen 60. Also, the user can input text while checking, on the edit screen 60, a completed example of the self-laminating label 60A, which places the text on the SL tape and indicates the tape cutting position.

Next, an outline of the edit processing executed by the CPU 21 of the printer 1 will be described. The edit processing is processing executed by the CPU 21 when the user edits a label. As described above, the CPU 21 displays the edit screens 51 to 60 according to the type of tape and label to be created, receives an operation by the user, and edits the label. In a case where the tape cassette 3 has been replaced during execution of edit processing, the CPU 21 switches from a label edit mode corresponding to the tape before tape replacement to a label edit mode corresponding to tape after tape replacement, according to the type of tape that is newly installed. At this time, in a case where the configuration of the print data in the edit mode before tape replacement and the configuration of the print data in the edit mode after tape replacement are compatible, the CPU 21 switches the text entered in the edit mode before tape replacement to the edit mode after tape replacement to inhibit the text from being reinput. On the other hand, in a case where the configuration of the print data in the edit mode before tape replacement and the configuration of the print data in the edit mode after tape replacement are not compatible, the CPU 21 checks with the user whether to delete the text that was input in the edit mode before tape replacement and then switch to the edit mode after tape replacement, or maintain the edit mode before tape replacement. When the user presses the print key 15, the CPU 21 prints the image of the edited text on the tape to be printed, creating a label.

Figure 6:
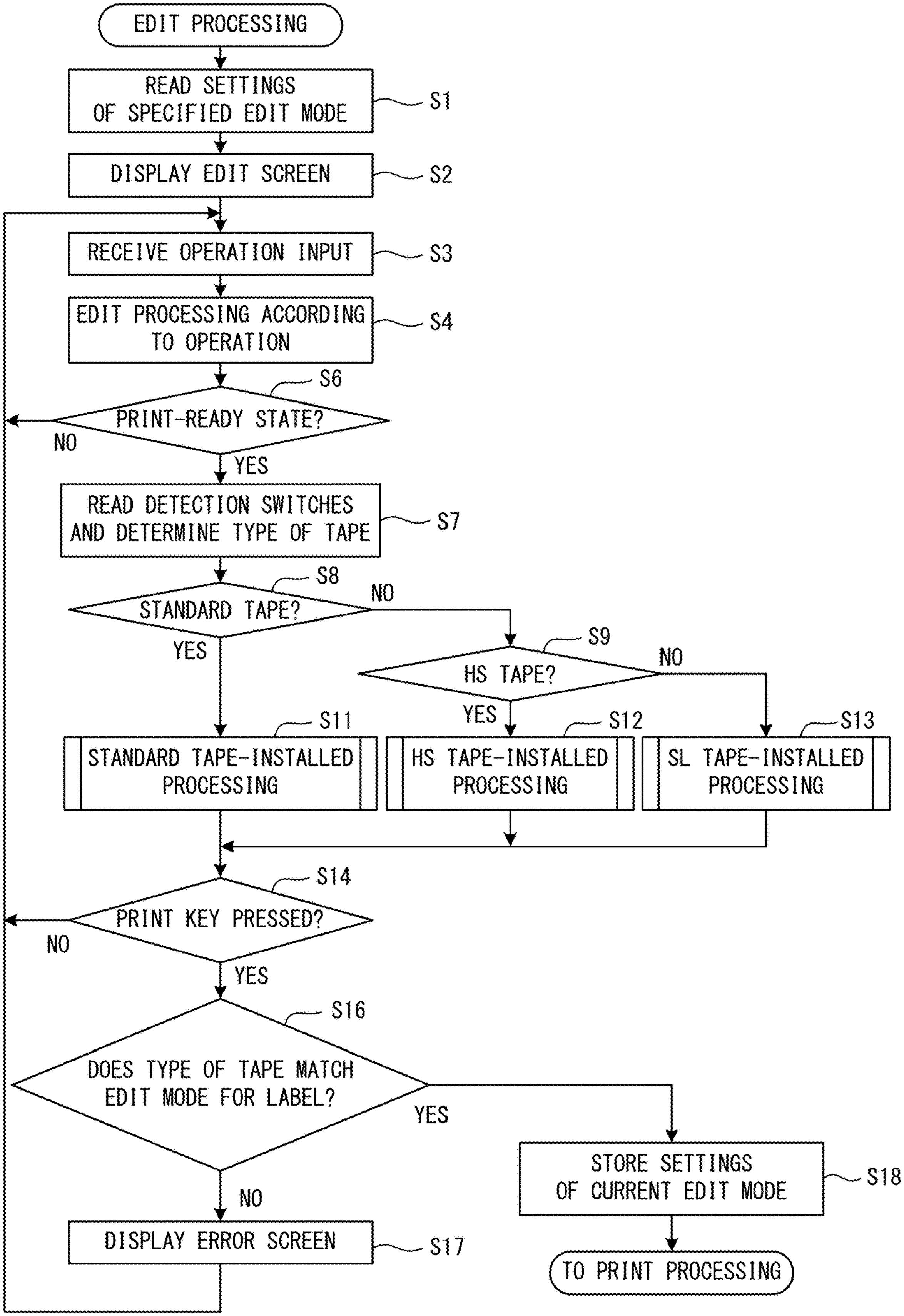
FIG. 6 is a flowchart of edit processing.

The edit processing will be described with reference to FIG. 6 to FIG. 11. When the power key 14 of the printer 1 is pressed such that the power turns on, the CPU 21 of the printer 1 executes various control programs stored in the ROM 22. When the user presses any one of the label editing keys 16, the CPU 21 reads and executes an edit processing program from the ROM 22. As shown in FIG. 6, the CPU 21 reads setting values of the label edit mode specified by the label editing keys 16 from the flash memory 25 (S1). The setting values of the edit mode are setting values that have been set by the user for each type of label, and are stored in the flash memory 25 when the edit processing ends. In a case where there are no setting values of the edit mode corresponding to the label, the CPU 21 reads initial values stored beforehand in the flash memory 25. The CPU 21 displays the edit screen for the label specified by the user on the display 11 with the setting values applied (S2).

The CPU 21 receives an input of an operation of the input portion 12 by the user (S3), and performs label edit processing according to the input operation (S4). The label edit processing includes, for example, processing to change setting values, such as the length of the label, processing to change the layout, such as text orientation, placement, and font size, and processing to edit text, such as inputting text and deleting text. When the user inputs accented characters or performs Kana-Kanji conversion, for example, when inputting text, the CPU 21 displays candidates for input or conversion on the edit screen.

The CPU 21 determines whether the state is a print-ready state (S6). The print-ready state refers to a state in which when the print key 15 is pressed, the processing changes to print processing where printing can be performed on the tape. That is, the print-ready state is a state in which all of the processing related to label editing has ended. More specifically, the print-ready state is a state in which changes to the setting values have been completed, a state in which layout changes have been completed, and a state in which text editing has been completed, and the like. For example, a state in which input candidates for accented characters or candidates for Kana-Kanji conversion are displayed is not a print-ready state. In a case where the state is not a print-ready state (no at S6), the CPU 21 returns the processing to S3 and receives an operation input.

In a case where the state is a print-ready state (yes at S6), the CPU 21 obtains the detection results of the detector 33, reads the states of the detection switches, and determines the type of tape housed in the tape cassette 3 installed in the cassette compartment 17 (S7). In a case where the tape cassette 3 of the standard tape is installed (yes at S8), the CPU 21 moves on to standard-tape-installed processing (S11).

Figure 7:
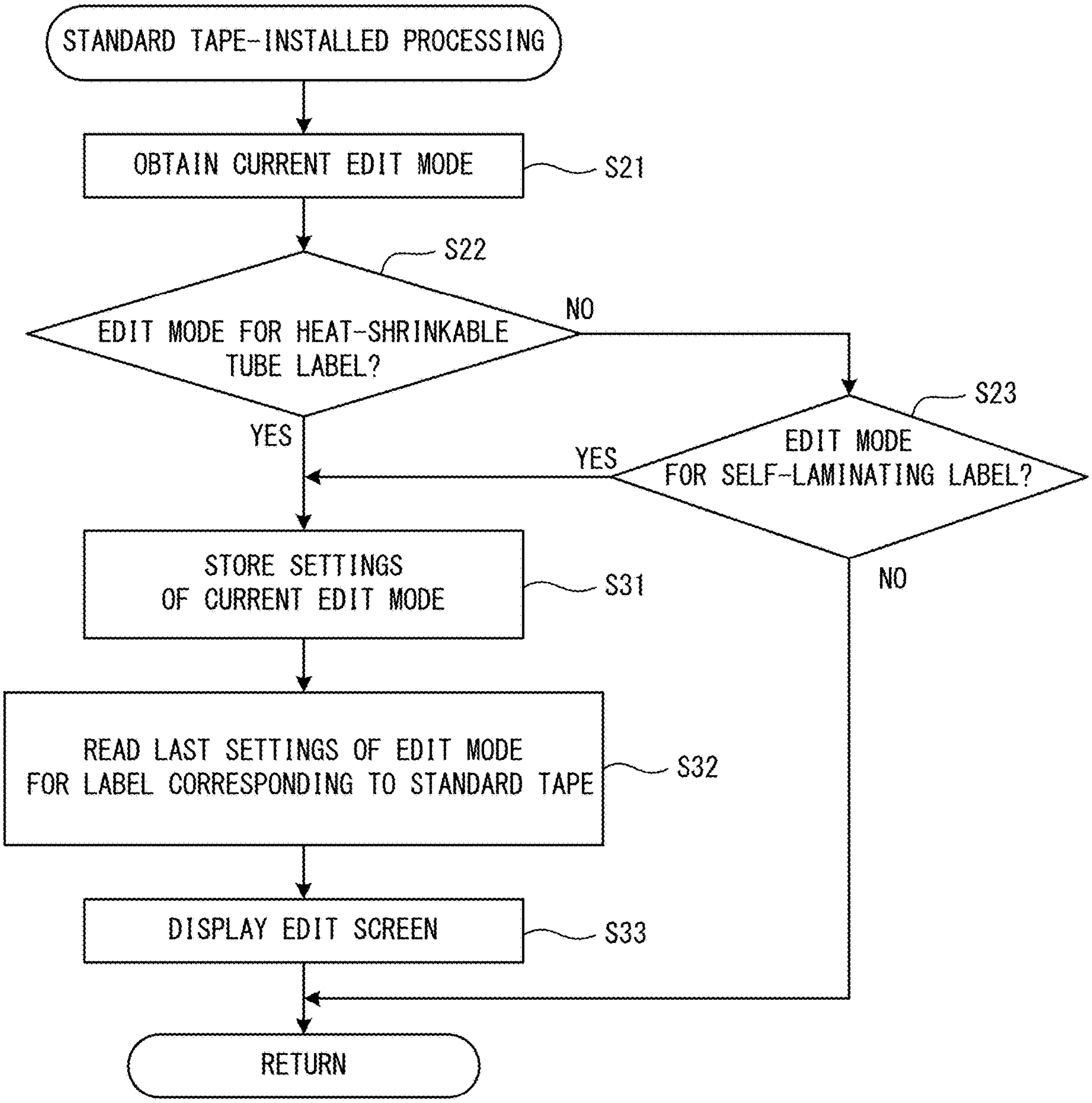
FIG. 7 is a flowchart of processing when standard tape is installed.

As shown in FIG. 7, in the standard-tape-installed processing, the CPU 21 obtains the type of label to be used in the current edit mode (S21). In a case where the tape cassette 3 has not been replaced and the current edit mode is the edit mode for a label corresponding to the standard tape (no at S22 and no at S23), the CPU 21 does not change the edit mode and maintains the edit mode of the label currently being edited, as shown in the mode change handling table in FIG. 10. Therefore, the CPU 21 returns the processing to the edit processing and moves on to S14. If the print key 15 is not pressed (no at S14), the CPU 21 returns the processing to S3 and continues the label editing in the current edit mode, as shown in FIG. 6.

When the print key 15 is pressed while editing the label (yes at S14), the CPU 21 determines whether the type of tape housed in the tape cassette 3 that is installed in the cassette compartment 17 and the corresponding type of tape in the edit mode of the label currently being edited match based on the detection result of the detector 33 (S16). In a case where the type of tape and the label edit mode match (yes at S16), the CPU 21 stores the setting values of the current edit mode in the flash memory 25 (S18), and moves on to print processing, not shown in the drawings. The CPU 21 prints an image of the edited text on the tape to be printed, creating the label.

On the other hand, as shown in FIG. 7, in a case where the current edit mode is the heat-shrinkable tube label edit mode (yes at S22) or the self-laminating label edit mode (no at S22 and yes at S23), the tape has been replaced by the tape cassette 3 of standard tape, so the CPU 21 changes the edit mode. The CPU 21 stores the setting values of the current edit mode in the flash memory 25 (S31). The CPU 21 reads the last setting values of the edit mode of the label that was last edited, among the labels corresponding to the standard tape, from the flash memory 25 (S32). The CPU 21 displays the edit screen of the label that was last edited, among the labels corresponding to the standard tape, on the display 11 with the setting values applied (S33). As shown in the mode change handling table in FIG. 10, in a case where the mode changes from the edit mode of the heat-shrinkable tube label or the self-laminating label to the edit mode of a label corresponding to the standard tape, the configurations of the print data in the edit modes are compatible. The CPU 21 applies the text being edited as the text of the label in the edit mode after the change and displays that text on the edit screen. The CPU 21 returns the processing to the edit processing and moves on to S14. As shown in FIG. 6, if the print key 15 is not pressed (no at S14), the CPU 21 returns the processing to S3 and continues label editing in the edit mode after the change.

As shown in FIG. 6, in a case where, when determining the type of tape housed in the tape cassette 3 that is installed in the cassette compartment 17 during label editing (S7), it is determined that the type of tape is HS tape (no at S8 and yes at S9), the CPU 21 moves on to HS tape-installed-processing (S12).

Figure 8:
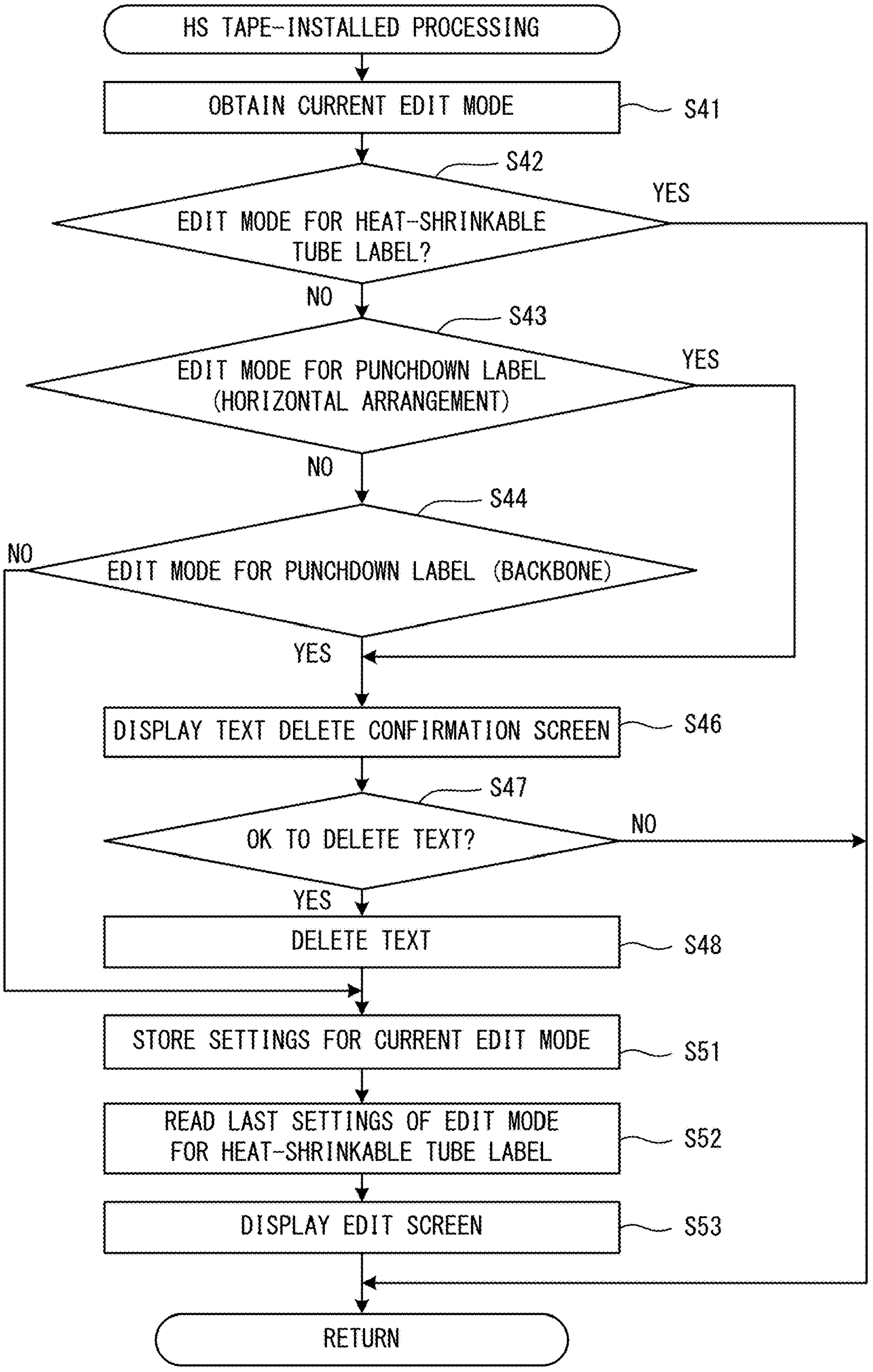
FIG. 8 is a flowchart of processing when HS tape is installed.

As shown in FIG. 8, in the HS tape-installed-processing, the CPU 21 obtains the type of label to be used in the current edit mode (S41). In a case where the tape cassette 3 has not been replaced and the current edit mode is the edit mode for the heat-shrinkable tube label (yes at S42), the CPU 21 does not change the edit mode and maintains the edit mode for the heat-shrinkable tube label that is currently being edited, as shown in the mode change handling table in FIG. 10. Therefore, the CPU 21 returns the processing to the edit processing and moves on to S14. If the print key 15 is not pressed (no at S14), the CPU 21 returns the processing to S3 and continues editing of the heat-shrinkable tube label, as shown in FIG. 6.

On the other hand, as shown in FIG. 8, in a case where the current edit mode is the edit mode for a self-laminating label or a label corresponding to the standard tape (no at S42), the tape cassette 3 has been replaced with the tape cassette 3 of HS tape, so the CPU 21 changes the edit mode. At this time, if the current edit mode is neither the edit mode for the punchdown label 54A (horizontal arrangement) nor the edit mode for the punchdown label 55A (backbone) (no at S43 and no at S44), the configurations of the print data in the edit modes are compatible, as shown in the mode change handling table in FIG. 10. As shown in FIG. 8, the CPU 21 stores the setting values of the current edit mode in the flash memory 25 (S51), and reads the setting values of the edit mode for the last heat-shrinkable tube label from the flash memory 25 (S52). The CPU 21 displays the edit screen for the heat-shrinkable tube label on the display 11 with the setting values applied (S53). As shown in the mode change handling table in FIG. 10, in a case where the edit mode changes from the edit mode for a label corresponding to the standard tape, except for the edit mode for the punchdown label 54A (horizontal arrangement) and the punchdown label 55A (backbone), to the edit mode for the heat-shrinkable tube label, the CPU 21 applies the text currently being edited as the text of the heat-shrinkable tube label and displays it on the edit screen. Note that with a label in which text is provided in each of a plurality of blocks, the CPU 21 applies the text in the first block, for example, as the text for the heat-shrinkable tube label. Similarly, in a case where changing from the edit mode for the self-laminating label to the edit mode for the heat-shrinkable tube label, the CPU 21 applies the text being edited as the text of the heat-shrinkable tube label and displays it on the edit screen. The CPU 21 returns the processing to the edit processing and moves on to S14. As shown in FIG. 6, if the print key 15 is not pressed (no at S14), the CPU 21 returns the processing to S3 and continues editing of the label in the edit mode for the heat-shrinkable tube label.

Figure 11A:
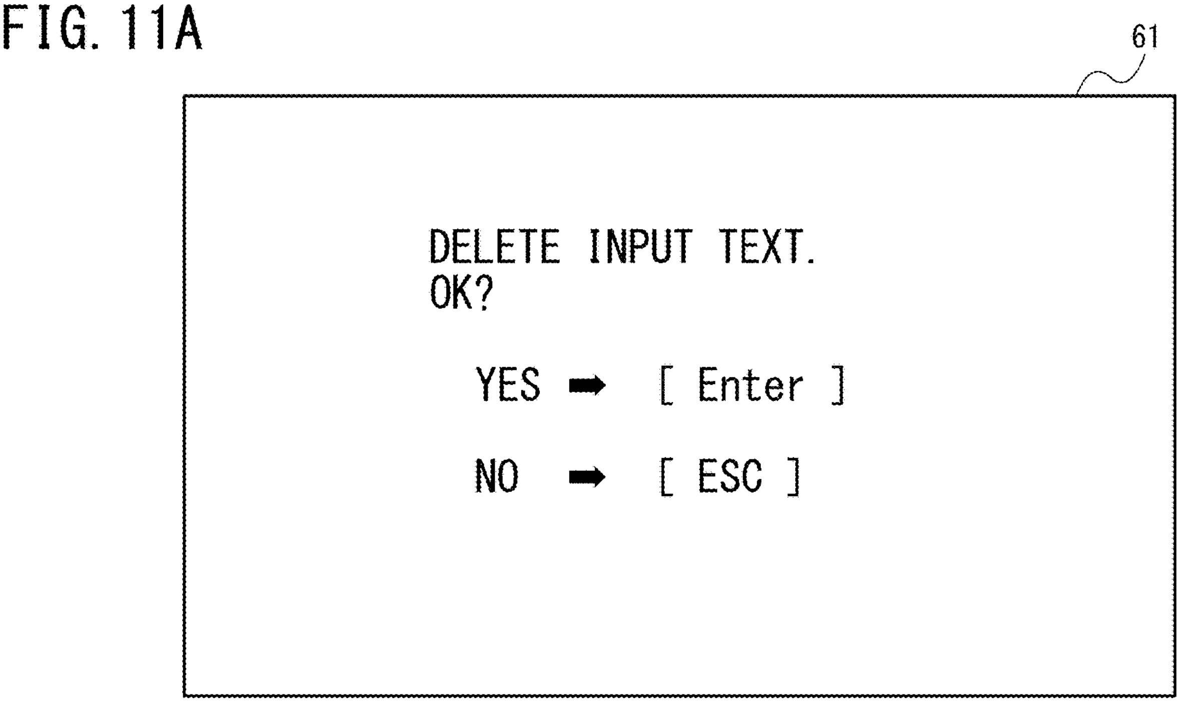
FIGS. 11A-11B are views showing a confirmation screen and an error screen.

In the processing at S42 in FIG. 8, in a case where, when the tape cassette 3 has been replaced with the tape cassette 3 of the HS tape and the edit mode is changed (no at S42), the current edit mode is the edit mode for the punchdown label 54A (horizontal arrangement) (yes at S43) or the edit mode for the punchdown label 55A (backbone) (no at S43 and yes at S44), the configurations of the print data in the edit modes are not compatible, as shown in the mode change handling table in FIG. 10. As shown in FIG. 8, the CPU 21 displays, on the display 11, a confirmation screen 61 for confirming whether to delete the text (S46). As shown in FIG. 11A, the CPU 21 displays "Delete input text. OK?" on the confirmation screen 61. The CPU 21 displays, on the confirmation screen 61, an instruction prompting the user to press an [Enter] key of the input portion 12 in a case where the user agrees to delete the text (when "Yes"), and displays an instruction prompting the user to press an [ESC] key of the input portion 12 in a case where the user does not agree to delete the text (when "No").

As shown in FIG. 8, in a case where the user agrees to delete the text and presses the [Enter] key (yes at S47), the CPU 21 deletes the text input in the current edit mode (S48), and moves the processing on to S51. The CPU 21 then changes to the edit mode for the heat-shrinkable tube label and displays the edit screen for the heat-shrinkable tube label with no text input (S53). The CPU 21 then returns the processing to the edit processing and moves on to S14. As shown in FIG. 6, if the print key 15 is not pressed (no at S14), the CPU 21 returns the processing to S3 and continues editing of the label in the edit mode for the heat-shrinkable tube label.

On the other hand, as shown in FIG. 8, in a case where the user does not agree to delete the text and presses the [ESC] key (no at S47), the CPU 21 maintains the current edit mode and returns the processing to the edit processing and moves on to S14 without deleting the text. As shown in FIG. 6, if the print key 15 is not pressed (no at S14), the CPU 21 returns the processing to S3 and continues editing of the label in the original edit mode.

Figure 11B:
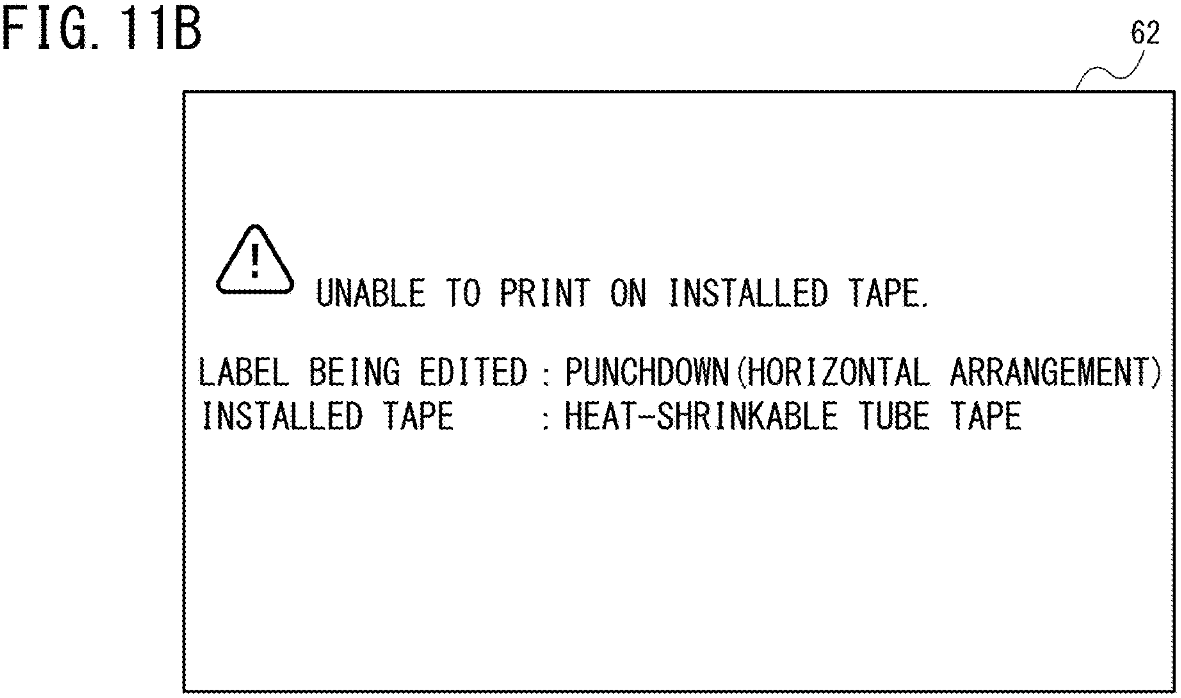

When the print key 15 is pressed while the label is being edited (yes at S14), the CPU 21 determines whether the type of tape housed in the tape cassette 3 that is installed in the cassette compartment 17 and the corresponding type of tape in the edit mode of the label currently being edited match based on the detection results from the detector 33 (S16). In a case where the type of tape and the edit mode for the label do not match (no at S16), the CPU 21 displays an error screen 62 on the display 11. The CPU 21 displays "Unable to print on installed tape" on the error screen 62, as shown in FIG. 11B. Also, the CPU 21 displays, on the error screen 62, the type of label currently being edited and the type of tape that is installed. The user then either installs the tape cassette 3 housing the tape corresponding to the type of label currently being edited or changes the edit mode to the edit mode of the label corresponding to the type of tape that is installed based on the error screen 62. The CPU 21 then returns the processing to S3 and continues editing of the label.

As shown in FIG. 6, in a case where, when determining the type of tape housed in the tape cassette 3 that is installed in the cassette compartment 17 during editing of the label, the tape is the SL tape (no at S8 and no at S9), the CPU 21 changes to SL tape-installed processing (S13).

Figure 9:
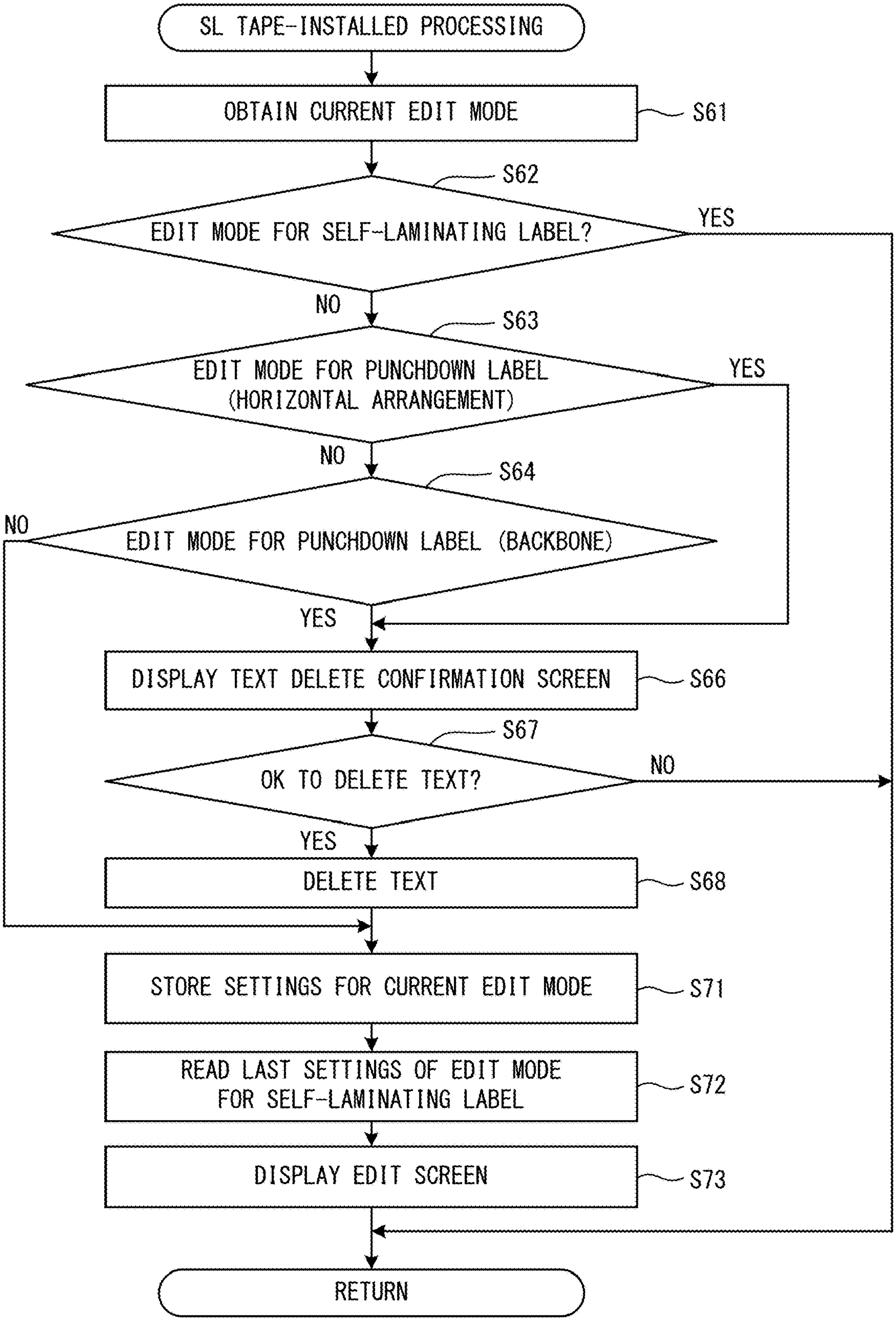
FIG. 9 is a flowchart of processing when SL tape is installed.

As shown in FIG. 9, in the SL tape-installed-processing, the CPU 21 obtains the type of the label to be used in the current edit mode (S61). In a case where the tape cassette 3 has not been replaced and the current edit mode is the edit mode for a label corresponding to the self-laminating tape (yes at S62), the CPU 21 does not change edit mode and maintains the edit mode of the self-laminating label currently being edited, as shown in the mode change handling table in FIG. 10. Therefore, the CPU 21 returns the processing to the edit processing and moves on to S14. If the print key 15 is not pressed (no at S14), the CPU 21 returns the processing to S3 and continues editing of the self-laminating label, as shown in FIG. 6.

On the other hand, as shown in FIG. 9, in a case where the current edit mode is the edit mode for a heat-shrinkable tube label or a label corresponding to the standard tape (no at S62), the tape cassette 3 has been replaced with the tape cassette 3 of the SL tape, so the CPU 21 changes the edit mode. At this time, if the current edit mode is neither the edit mode for the punchdown label 54A (horizontal arrangement) nor the edit mode for the punchdown label 55A (backbone) (no at S63 and no at S64), the configurations of the print data in the edit modes are compatible, as shown in the mode change handling table in FIG. 10. As shown in FIG. 9, the CPU 21 stores the setting values of the current edit mode in the flash memory 25 (S71), and reads the setting values of the edit mode for the last self-laminating label from the flash memory 25 (S72). The CPU 21 displays the edit screen for the self-laminating label on the display 11 with the setting values applied (S73). As shown in the mode change handling table in FIG. 10, in a case where the edit mode changes from the edit mode for a label corresponding to the standard tape, except for the edit mode for the punchdown label 54A (horizontal arrangement) and the punchdown label 55A (backbone), to the edit mode for the self-laminating label, the CPU 21 applies the text currently being edited as the text of the self-laminating label and displays it on the edit screen. Note that with a label in which text is provided in each of a plurality of blocks, the CPU 21 applies the text in the first block, for example, as the text for the self-laminating label. Similarly, in a case where changing from the edit mode for the heat-shrinkable tube label to the edit mode for the self-laminating label, the CPU 21 applies the text being edited as the text of the self-laminating label and displays it on the edit screen. The CPU 21 returns the processing to the edit processing and moves on to S14. As shown in FIG. 6, if the print key 15 is not pressed (no at S14), the CPU 21 returns the processing to S3 and continues editing of the label in the edit mode for the self-laminating label.

In the processing at S62 in FIG. 9, in a case where, when the tape cassette 3 has been replaced with the tape cassette 3 of the SL tape and the edit mode is changed (no at S62), the current edit mode is the edit mode for the punchdown label 54A (horizontal arrangement) (yes at S63) or the edit mode for the punchdown label 55A (backbone) (no at S63 and yes at S64), the configurations of the print data in the edit modes are not compatible, as shown in the mode change handling table in FIG. 10. As shown in FIG. 9, the CPU 21 displays, on the display 11, the confirmation screen 61 (refer to FIG. 11A) for confirming whether to delete the text (S66).

In a case where the user agrees to delete the text and presses the [Enter] key (yes at S67), the CPU 21 deletes the text input in the current edit mode (S68) and moves the processing on to S71. The CPU 21 then changes to the edit mode for the self-laminating label and displays the edit screen for the self-laminating label with no text input (S73). The CPU 21 then returns the processing to the edit processing and moves on to S14. As shown in FIG. 6, if the print key 15 is not pressed (no at S14), the CPU 21 returns the processing to S3 and continues editing of the label in the edit mode for the self-laminating label.

On the other hand, as shown in FIG. 9, in a case where the user does not agree to delete the text and presses the [ESC] key (no at S67), the CPU 21 maintains the current edit mode and returns the processing to the edit processing and moves on to S14 without deleting the text. As shown in FIG. 6, in a case where the print key 15 is not pressed (no at S14), the CPU 21 returns the processing to S3 and continues editing of the label in the original edit mode. In this case, when the print key 15 is pressed while the label is being edited (yes at S14), the type of tape and the edit mode for the label do not match (no at S16), so the CPU 21 displays the error screen 62 (refer to FIG. 11B) on the display 11. The user then either installs the tape cassette 3 housing the tape corresponding to the type of label currently being edited in the cassette compartment 17 or changes the edit mode to the edit mode of the label corresponding to the type of tape that is installed. The CPU 21 then returns the processing to S3 and continues editing of the label.

As described above, in a case where the configuration of the print data for printing on the standard tape is compatible with the print data for printing on the HS tape and the SL tape, the CPU 21 can change to the edit mode for the heat-shrinkable tube label or the self-laminating label while keeping the text edited in the edit mode of the label corresponding to the standard tape without asking the user whether to delete the text. Therefore, the CPU 21 can smoothly change the edit mode without bothering the user with inquiries. On the other hand, in a case where the print data for printing on the standard tape is not compatible with the print data for printing on the HS tape and the SL tape, the CPU 21 can ask the user whether to delete the text and change to the edit mode for the heat-shrinkable tube label or the self-laminating label, or keep the print data and continue the edit mode for the standard tape, Therefore, even if the user accidentally replaces the tape cassette 3, the CPU 21 can continue editing the original print data if the original tape cassette 3 is returned.

The CPU 21 displays the error screen 62 if there is an attempt to print on the HS tape or the SL tape while maintaining print data incompatible with the HS tape or the SL tape, from among print data for printing on a label corresponding to the standard tape. Therefore, the CPU 21 can inhibit printing on the HS tape or the SL tape with incompatible print data.

In a case where the configuration of the print data of a label corresponding to the standard tape and the configuration of the print data of a label corresponding to the HS tape or the SL tape are incompatible, the CPU 21 can ask the user whether to delete the text when changing the edit mode. Therefore, the CPU 21 can inhibit the print data for printing on the HS tape or the SL tape from being edited by a configuration unsuitable for the HS tape or the SL tape by having the user who was asked check the tape cassette 3.

In a case where the user agrees to delete the text, the CPU 21 can delete the text edited in the edit mode for the punchdown label 54A or 55A (horizontal arrangement or backbone), and edit new text in the edit mode of the heat-shrinkable tube label or the self-laminating label. Therefore, the CPU 21 can inhibit the print data for printing on the HS tape or the SL tape from being edited by a configuration unsuitable for the HS tape or the SL tape.

In a case where the user does not agree to delete the text, the CPU 21 can continue editing of the label in the original edit mode without deleting the text edited in the edit mode of the punchdown label 54A or 55A (horizontal arrangement or backbone). Therefore, even if the user accidentally replaces the tape cassette 3, the CPU 21 can use the text edited in the original edit mode for printing on the standard tape if the original tape cassette 3 is returned.

In a case where the configuration of the print data for the standard tape and the configuration of the print data for the HS tape or the SL tape are compatible, the CPU 21 can change the edit mode without asking the user, and edit the text edited in the original edit mode in the edit mode after the change. Therefore, the CPU 21 can smoothly change the edit mode without bothering the user with inquiries.

In the embodiment described above, the tape is one example of the medium of the present disclosure. The tape cassette 3 is one example of the cassette of the present disclosure. The keyboard including the character keys 13, the power key 14, the print key 15, and the label editing keys 16 is one example of the input portion of the present disclosure. The CPU 21 is one example of the processor of the present disclosure. The tape cassette 3 containing the standard tape is one example of the first cassette of the present disclosure. The standard tape is one example of the first medium of the present disclosure. The edit screens 51-58 are one example of the first edit screen of the present disclosure. The CPU 21 that executes steps S3 and S4 in the edit mode of the standard tape is one example of the first edit process of the present disclosure. The tape cassette 3 containing the HS tape and the SL tape is one example of the second cassette of the present disclosure. The HS tape and the SL tape is one example of the second medium of the present disclosure. The edit screens 59 and 60 is one example of the second edit screen of the present disclosure. The CPU 21 that executes steps S3 and S4 in the edit mode of the heat-shrinkable tube label or self-laminating label is one example of the second edit process of the present disclosure. The CPU 21 that executes steps S12 and S13 is one example of the changing of the present disclosure. The confirmation screen 61 is one example of the selection screen of the present disclosure. The CPU 21 that executes steps S47 and S67 is one example of the selecting of the present disclosure. The error screen 62 is one example of the notification screen of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The printer 1 is not limited to a handheld type, and may alternatively be a stationary type. The standard tape, the HS tape, and the SL tape are merely examples of media; various other types of tape may also be used. The medium is not limited to tape. For example, the printer 1 may create labels by printing an image on a sheet. Although the configuration of the print data of a punchdown label (horizontal arrangement or backbone) is not compatible with the configuration of the print data of the heat-shrinkable tube label and the self-laminating label in the above-described embodiment, the combination of labels with incompatible print data configurations may be a combination of other labels, or a combination with other labels.

The edit processing is executed by the CPU 21 of the printer 1, but may alternatively be executed by a CPU of an external device such as a smartphone, a PC, or a tablet, for example. In this case, the external device need only connect to the printer 1 via wireless or wired communication, and transmit and receive information, such as or transmit and receive print data, or obtain detection results from the detector 33.

What is claimed is:

1. A printer, providing with a cassette compartment to which a cassette housing a medium being detachably attachable, a detector for detecting a type of the cassette attached to the cassette compartment, and a printing portion for printing an image based on print data on the medium drawn out from the cassette, comprising:

a display for displaying information;

an input portion for receiving input of an operation;

a processor; and a memory configured to store computer-readable instructions that instruct the processor to perform processes comprising:

a first edit process displaying a first edit screen on the display and editing the print data, the first edit screen being an edit screen matching a first medium housed in a first cassette, the first cassette being one type of the cassette;

a second edit process displaying a second edit screen on the display and editing the print data, the second edit screen being an edit screen matching a second medium housed in a second cassette, the second cassette being a different type than the first cassette;

a change process changing a process to edit the print data from the first edit process to the second edit process; and a selection process displaying, on the display, a selection screen presenting options, and receiving a selection of an option via the input portion, wherein the computer-readable instructions further instruct the processor to perform processes, in a case where the detector detects the second cassette is attached to the cassette compartment while the first edit process is being executed, comprising:

determining whether a configuration of the print data for printing on the first medium and a configuration of the print data for printing on the second medium are at least partially compatible;

executing the change process with a compatible portion of the configuration of the print data between the configuration of the print data for printing on the first medium and the configuration of the print data for printing on the second medium maintained in a case where the processor determines that the configuration of the print data for printing on the first medium and the configuration of the print data for printing on the second medium are at least partially compatible; and executing the selection process and receiving the selection of a first option or a second option through the input portion in a case where the processor determines that the configuration of the print data for printing on the first medium and the configuration of the print data for printing on the second medium are incompatible, the first option deleting the print data edited in the first edit process, and editing a new print data in the second edit process, and the second option not deleting the print data edited in the first edit process, and editing the print data in the first edit process.

2. The printer according to claim 1, wherein the computer-readable instructions further instruct the processor to perform processes comprising:

displaying, on the display, a notification screen providing notification that printing on the second medium with the print data for printing on the first medium is not possible in a case where input of an operation instructing the printing portion to execute printing has been received by the input portion after the second option is selected in the selection process.

3. The printer according to claim 1, wherein in a case where the detector detects that the second cassette is attached to the cassette compartment while the first edit process is being executed, and in a case where the first medium is a medium having a print area in which an arrangement configuration on the first medium of an image to be printed based on the print data is configured to be changed and the second medium is a medium having a print area in which an arrangement configuration on the second medium of an image to be printed based on the print data is fixed in a predetermined configuration, the selection process is executed as the configuration of the print data for printing on the first medium and the configuration of the print data for printing on the second medium are incompatible.

4. The printer according to claim 3, wherein in a case where the first option is selected in the selection process, the change process is executed after deleting the print data edited in the first edit process, and the new print data is edited in the second edit process.

5. The printer according to claim 3, wherein in a case where the second option is selected in the selection process, the first edit process is continued without deleting the print data edited in the first edit process.

6. The printer according to claim 1, wherein in a case where the detector detects that the second cassette is attached to the cassette compartment while the first edit process is being executed, and in a case where the first medium is a medium having a print area in which an arrangement configuration on the first medium of an image to be printed based on the print data is fixed in a predetermined configuration, and the second medium is a medium having a print area in which an arrangement configuration on the second medium of an image to be printed based on the print data is configured to be changed, the change process is executed with the compatible portion of the configuration of the print data maintained as the configuration of the print data for printing on the first medium and the configuration of the print data for printing on the second medium are compatible.

7. A non-transitory computer-readable medium storing computer-readable instructions for editing print data that are executed by a processor provided in a printer, providing with a cassette compartment to which a cassette housing a medium to be printed being detachably attachable, a detector for detecting a type of the cassette installed in the cassette compartment, a printing portion for printing on the medium drawn out from the cassette, a display for displaying information, and an input portion for receiving input of an operation, for printing, on a medium, an image based on the print data used to print on the medium, the computer-readable instructions instructing the processor to perform processes comprising:

a first edit process displaying a first edit screen on the display and editing the print data, the first edit screen being an edit screen matching a first medium housed in a first cassette, the first cassette being one type of the cassette;

a second edit process displaying a second edit screen on the display and editing the print data, the second edit screen being an edit screen matching a second medium housed in a second cassette, the second cassette being a different type than the first cassette;

a change process changing a process to edit the print data from the first edit process to the second edit process; and a selection process displaying, on the display, a selection screen presenting options, and receiving a selection of an option via the input portion, wherein the computer-readable instructions further instruct the processor to perform processes, in a case where the detector detects the second cassette is attached to the cassette compartment while the first edit process is being executed, comprising:

determining whether a configuration of the print data for printing on the first medium and a configuration of the print data for printing on the second medium are at least partially compatible;

executing the change process with a compatible portion of the configuration of the print data between the configuration of the print data for printing on the first medium and the configuration of the print data for printing on the second medium maintained in a case where the processor determines that the configuration of the print data for printing on the first medium and the configuration of the print data for printing on the second medium are at least partially compatible; and executing the selection process and receiving the selection of a first option or a second option through the input portion in a case where the processor determines that the configuration of the print data for printing on the first medium and the configuration of the print data for printing on the second medium are incompatible, the first option deleting the print data edited in the first edit process, and editing a new print data in the second edit process, and the second option not deleting the print data edited in the first edit process, and editing the print data in the first edit process.

8. A print data editing device for editing print data used by a printer to print on a medium, the printer including a cassette compartment to which a cassette housing the medium to be printed being detachably attachable, a detector for detecting a type of the cassette installed in the cassette compartment, and a printing portion for printing on the medium drawn out from the cassette, the print data editing device comprising:

a display for displaying information;

an input portion for receiving input of an operation;

a processor; and a memory configured to store computer-readable instructions that instruct the processor to execute operations comprising:

a first edit process displaying a first edit screen on the display and editing the print data, the first edit screen being an edit screen matching a first medium housed in a first cassette, the first cassette being one type of the cassette;

a second edit process displaying a second edit screen on the display and editing the print data, the second edit screen being an edit screen matching a second medium housed in a second cassette, the second cassette being a different type than the first cassette;

a change process changing a process to edit the print data from the first edit process to the second edit process; and a selection process displaying, on the display, a selection screen presenting options, and receiving a selection of an option via the input portion, wherein the computer-readable instructions further instruct the processor to perform processes, in a case where the detector detects the second cassette is attached to the cassette compartment while the first edit process is being executed, comprising:

determining whether a configuration of the print data for printing on the first medium and a configuration of the print data for printing on the second medium are at least partially compatible;

executing the change process with a compatible portion of the configuration of the print data between the configuration of the print data for printing on the first medium and the configuration of the print data for printing on the second medium maintained in a case where the processor determines that the configuration of the print data for printing on the first medium and the configuration of the print data for printing on the second medium are at least partially compatible; and executing the selection process and receiving the selection of a first option or a second option through the input portion in a case where the processor determines that the configuration of the print data for printing on the first medium and the configuration of the print data for printing on the second medium are incompatible, the first option deleting the print data edited in the first edit process, and editing a new print data in the second edit process, and the second option not deleting the print data edited in the first edit process, and editing the print data in the first edit process.

* * * * *